US010433490B2

(12) United States Patent
Trucke et al.

(10) Patent No.: US 10,433,490 B2
(45) Date of Patent: Oct. 8, 2019

(54) FAN ASSEMBLY FOR EXHAUSTING MATTER FROM STORAGE CONTAINERS

(71) Applicant: Fresh Air Fans, LLC, Rodney, IA (US)

(72) Inventors: Gary Trucke, Rodney, IA (US); Vicki Helmbrecht, Rodney, IA (US)

(73) Assignee: Fresh Air Fans, LLC, Rodney, IA (US)

( * ) Notice: Subject to any disclaimer, the term of this patent is extended or adjusted under 35 U.S.C. 154(b) by 75 days.

(21) Appl. No.: 15/730,942

(22) Filed: Oct. 12, 2017

(65) Prior Publication Data
US 2018/0112670 A1 Apr. 26, 2018

Related U.S. Application Data

(60) Provisional application No. 62/412,129, filed on Oct. 24, 2016.

(51) Int. Cl.
| | |
|---|---|
| *A01F 25/22* | (2006.01) |
| *F04D 25/16* | (2006.01) |
| *F04D 29/00* | (2006.01) |
| *F04D 29/08* | (2006.01) |
| *E04H 7/24* | (2006.01) |

(Continued)

(52) U.S. Cl.
CPC ............. *A01F 25/22* (2013.01); *E04H 7/24* (2013.01); *F04D 19/002* (2013.01); *F04D 25/166* (2013.01); *F04D 29/002* (2013.01); *F04D 29/083* (2013.01); *F04D 29/601* (2013.01); *F24F 7/065* (2013.01); *A01F 25/163* (2013.01); *F24F 2007/001* (2013.01); *F24F 2221/12* (2013.01)

(58) Field of Classification Search
CPC .... F04D 25/166; F04D 19/002; F04D 29/083; F04D 29/4253; F04D 29/4226; F04D 29/601; F04D 29/644; F04D 29/646; F24F 7/065; F24F 2007/001; F24F 2007/003; F24F 2007/004; A01F 25/22; A01F 25/163; A01F 25/2018; B08B 15/002; E04H 7/24; B65D 88/742; B65D 88/745; B65D 88/748; B65D 88/68
See application file for complete search history.

(56) References Cited

U.S. PATENT DOCUMENTS 2,298,576 A * 10/1942 McElroy ............... F04D 29/646
　　　　　　　　　　　　　　　　　　　　　　　415/142
2,907,036 A *  9/1959 Collins ................ B65D 88/742
　　　　　　　　　　　　　　　　　　　　　　　454/179

(Continued)

*Primary Examiner* — Glenn F Myers
(74) *Attorney, Agent, or Firm* — McKee, Voorhees & Sease, PLC

(57) ABSTRACT

A fan assembly attaches to and may be used with an existing fan of a storage container. The fan assembly includes an exhaust fan, a mounting assembly for operatively mounting the exhaust fan to the existing fan of the storage container, and a sealing member operatively positioned between the exhaust fan and the existing fan to provide a seal to direct movement of air streams created, in part, by the exhaust fan. During operation of the exhaust fan, the exhaust fan pulls contaminated air and airborne matter from within the storage container through the existing fan and an existing duct in order to exhaust the contaminated air and airborne matter from the storage container.

18 Claims, 16 Drawing Sheets

(51) Int. Cl.
    *F24F 7/06*      (2006.01)
    *F04D 19/00*    (2006.01)
    *F04D 29/60*    (2006.01)
    *A01F 25/16*    (2006.01)
    *F24F 7/00*      (2006.01)

(56) References Cited

U.S. PATENT DOCUMENTS

| | | | | |
|---|---|---|---|---|
| 3,097,916 | A * | 7/1963 | Dawson | B65D 88/742 |
| | | | | 34/218 |
| 3,666,007 | A * | 5/1972 | Yoshino | B60H 1/00021 |
| | | | | 165/122 |
| 3,851,774 | A * | 12/1974 | Laidig | B65G 65/466 |
| | | | | 414/307 |
| 5,678,429 | A * | 10/1997 | Zonco | B65H 20/10 |
| | | | | 26/21 |
| 6,841,195 | B2 * | 1/2005 | Kunder | C23F 11/00 |
| | | | | 118/317 |

* cited by examiner

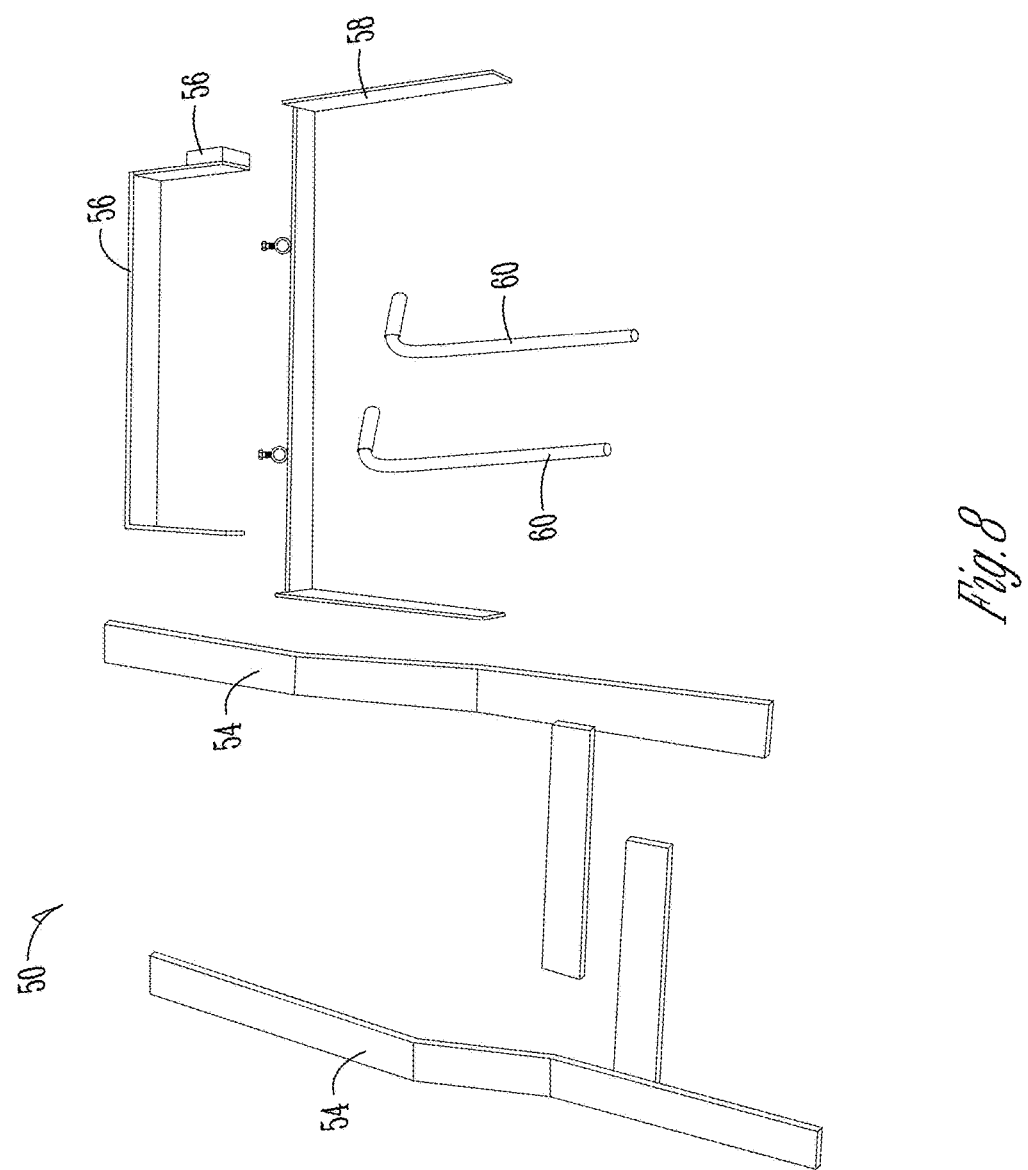

FAN ASSEMBLY FOR EXHAUSTING MATTER FROM STORAGE CONTAINERS

CROSS REFERENCE TO RELATED APPLICATIONS

This application claims priority under 35 U.S.C. § 119 to provisional application Ser. No. 62/412,129, filed Oct. 24, 2016, herein incorporated by reference in its entirety.

FIELD OF THE INVENTION

The present disclosure relates generally to a system, method, and/or apparatus for exhausting contaminated air from a storage container. More particularly, but not exclusively, the present disclosure is directed towards a fan assembly for the removal of airborne matter that can be used with storage containers of differing sizes and types.

BACKGROUND OF THE INVENTION

Bins, silos, and other storage containers receive particulate materials, such as grain that has been harvested. This particulate material is dried in the storage container to preserve the particulate material and to extend the useful life of the same.

In drying and maintaining grain and other particulate material, air, up to and including millions of cubic feet of air, can be blown through a storage container by a fan. The grain or other particulate material can serve as a large filter for the air, which traps the dust, pollen, and pollutants in the grain. When the dried material is moved or otherwise removed from the storage container, an auger such as a sweep auger can be used in conjunction with other augers or moving means to move the grain. At the point of using the sweep auger to finish unloading of the bin it is necessary for a person to be in the bin or other storage container to aid in further cleaning and removing the grain or other particulate material. For example, two to four inches of grain can remain on the floor behind the sweep auger.

However, the sweep auger can stir dust and other hazardous elements that has been trapped or otherwise held within the grain. This can create a risk of inhalant hazards or other harmful effects for the people within the storage container cleaning up the grain or other particulate material.

Therefore, there exists a need in the art for a way to mitigate the harmful effects associated with the release of hazardous airborne matter and other toxins due to the removal of grain or other particulate material within a storage container. There also exists a need to be able to adapt a system for use with the varying types, sizes, and other configurations of storage containers that hold a particulate material.

SUMMARY OF THE INVENTION

It is therefore a primary object, feature, and/or advantage of the disclosure to improve on and/or overcome the deficiencies in the art.

It is an object, feature, and/or advantage of the disclosure to provide a system, method, and/or apparatus that aids in the removal of harmful airborne matter associated with particulate material stored and removed from a storage container, such as a bin.

It is another object, feature, and/or advantage of the disclosure to provide a system that adapts to almost all types and sizes of storage containers.

It is still another object, feature, and/or advantage of the disclosure to provide a system that adapts to most all types and sizes of fans associated with storage containers in an easily adjustable manner.

It is yet another object, feature, and/or advantage of the disclosure to provide a system that is portable and easily used.

These and/or other objects, features, and advantages of the invention will be apparent to those skilled in the art. The invention is not to be limited to or by these objects, features and advantages. No single embodiment need provide each and every object, feature, or advantage.

The apparatus, system, and/or method disclosed herein adapts to most all types of storage containers (bins, silos, etc.), including any existing fans operated therewith. This can be done by adjusting mounting brackets and hooks. A tarp is also adjustable. The fan assembly can be adapted to a flex hose and collar for restrictive areas as well, and provide a portable and lighter assembly for movement from one storage container to another.

According to one embodiment, a fan assembly attaches to and is used with an existing fan of a storage container. The fan assembly has an exhaust fan, a mounting assembly for operatively mounting the exhaust fan to the existing fan of the storage container, and a sealing member operatively positioned between the exhaust fan and the existing fan to provide a seal to direct movement of air streams created, in part, by the exhaust fan. The sealing member comprises a tarp, and a plurality of magnets or a draw string is in operative communication with the tarp and at least partially surrounding the existing fan to aid in sealing the exhaust fan. The mounting assembly of the fan assembly may utilize brackets to substantially center the exhaust fan relative to the existing fan. The brackets may include adjustable side brackets, a bottom support bracket, a top hook bracket, and first and second hooks operatively attached to the top hook bracket for hanging the exhaust fan to the existing fan.

A storage system comprising a storage container having walls and a roof including vents may utilize the fan assembly described above. For example, the existing fan may be attached to an existing fan duct, the existing fan duct may be attached to the storage container near the bottom of the storage container, the storage container may be filled with a particulate material, and the storage container may have a perforated drying floor. The existing fan may be configured such that, during operation, the existing fan pushes air through the existing fan duct and into the storage container through the perforated drying floor such that the air rises in the storage container, the air dries the particulate material as it rises, and some of the air can escape the storage container via the vents. Additionally, the storage system may include a discharge basket centrally located in the perforated drying floor of the storage container capable of collecting the particulate material by allowing the particulate material to fall into the discharge basket and a discharge auger configured to transport the particulate material from the discharge basket to a location outside the storage container when the discharge auger is activated. Prolonged or repeated operation of the discharge auger may cause the amount of particulate material within the storage container to decrease to a point where additional assistance is needed to further empty the storage container. The additional assistance may be provided by a sweep auger. Repeated emptying, filling, and use of the existing fan may cause the air within the storage container to become contaminated with airborne matter. To address such a problem, the exhaust fan may be configured such that, during operation of the exhaust fan, the exhaust fan pulls the contaminated air through the perforated drying floor into the existing fan duct and existing fan and exhausts the contaminated air and airborne matter from the storage container.

Relatedly, a method of exhausting contaminated air and airborne matter from a storage container may comprise the steps of providing an exhaust fan, a mounting assembly for operatively mounting the exhaust fan to an existing fan of the storage container, and a sealing member operatively positioned between the exhaust fan and the existing fan to provide a seal to direct movement of air streams created, in part, by the exhaust fan; and operating the exhaust fan to exhaust the contaminated air and airborne matter from the storage container. The method may also include repeatedly filling and emptying the storage container with particulate material to create the contaminated air and airborne matter.

Figure 1:
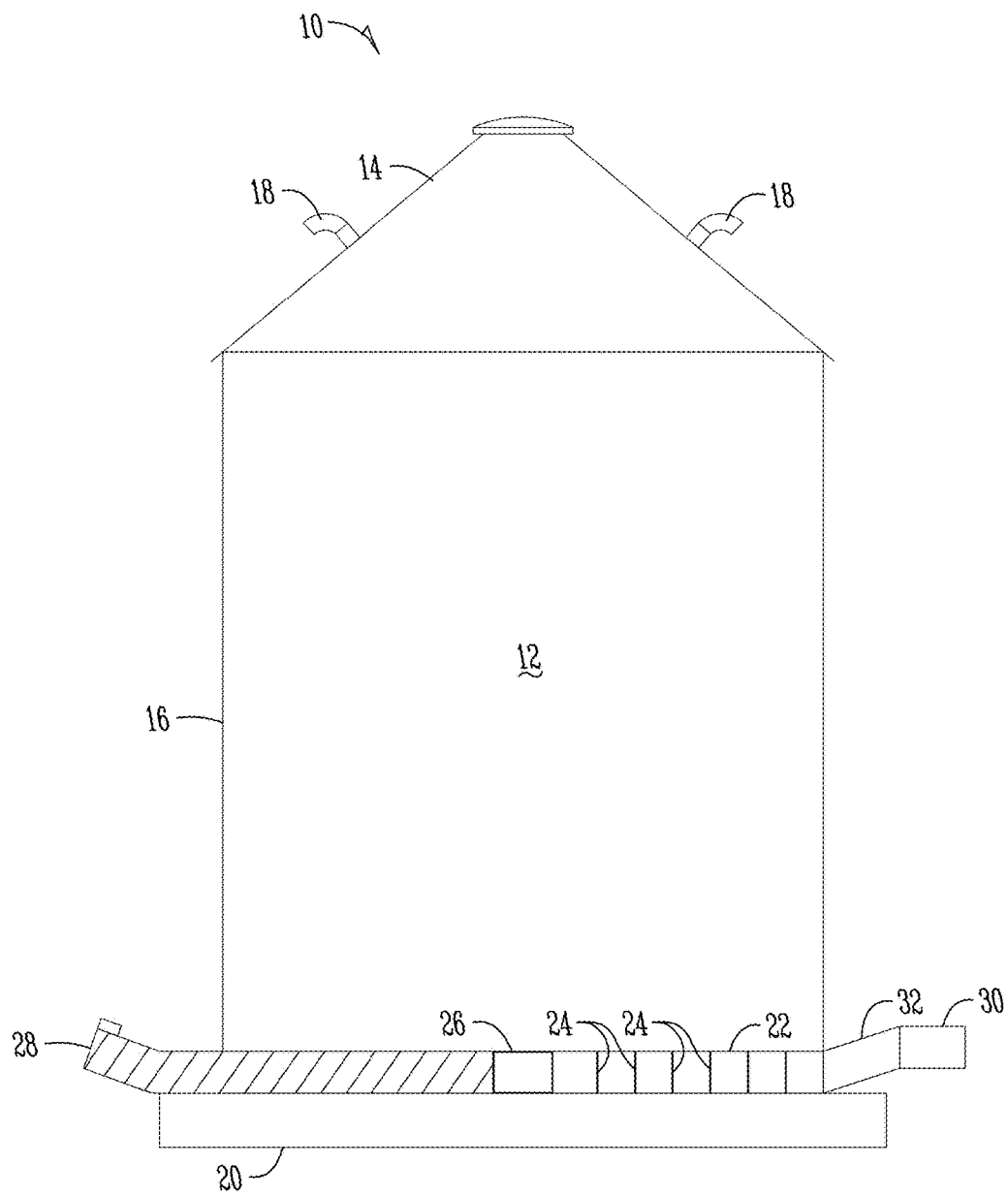
FIG. 1 is a depiction of a particulate storage container with an existing drying fan and a discharge auger.
Figure 2:
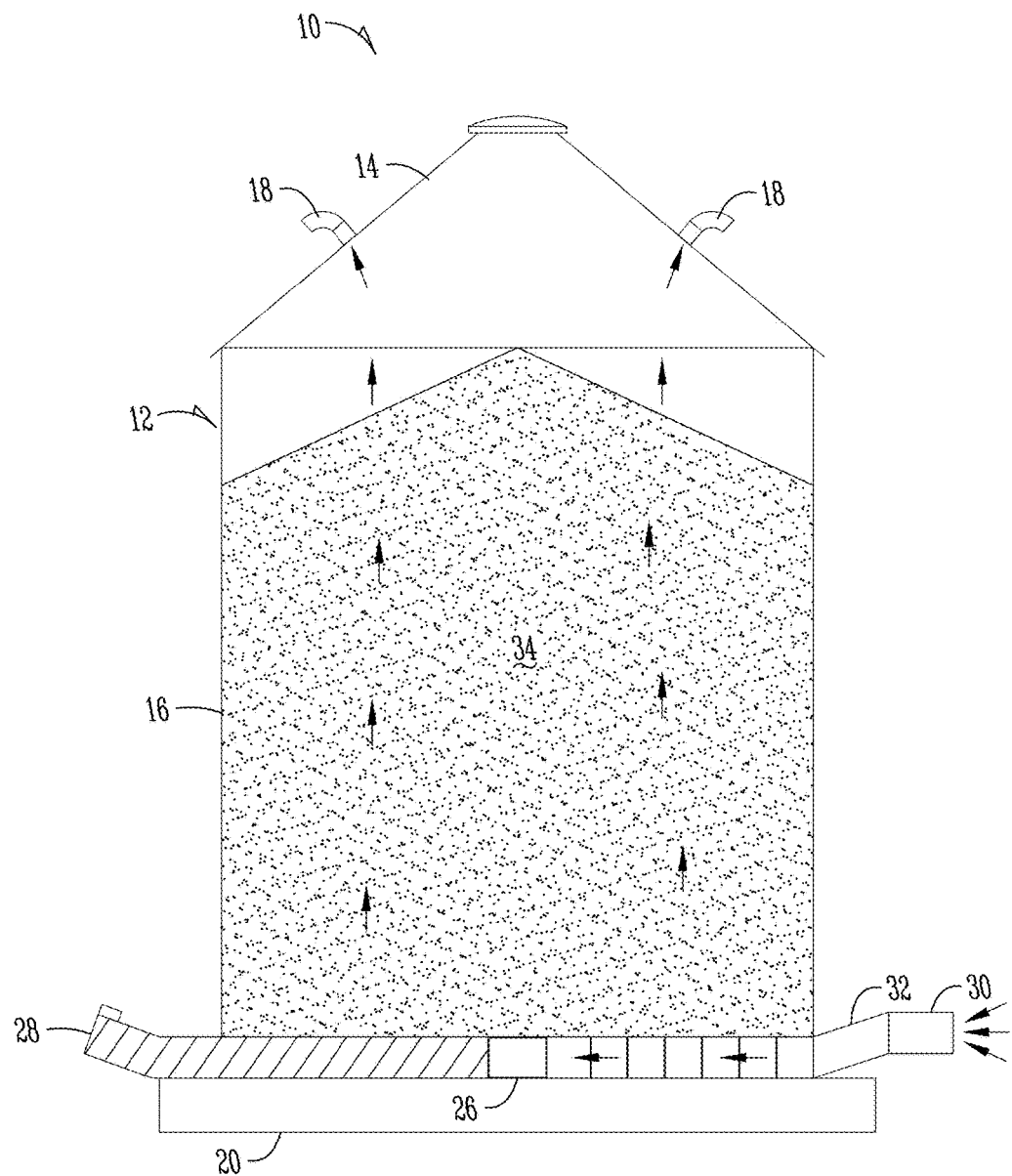
FIG. 2 is a depiction of the particulate storage container filled with an amount of particulate material.

FIG. 6 is a perspective view of an exhaust fan according to aspects of the disclosure.

FIGS. 7A and 7B are cross-section views of possible sealing members for use with the fan assembly according to aspects of the disclosure.

FIG. 8 is a perspective view showing components of a mounting assembly for use with the exhaust fan according to aspects of the disclosure.

FIG. 9 is a perspective view showing the mounting assembly in assembled form according to aspects of the disclosure.

FIG. 10 is a perspective view of the exhaust fan and mounting assembly prior to attachment to a storage container according to aspects of the disclosure.

FIG. 11 is a perspective view of the existing bin fans and ducts alongside two particulate storage containers according to aspects of the disclosure.

FIG. 12 is a perspective view of the fan assembly attached to an existing drying fan of a storage container according to aspects of the disclosure.

FIG. 13 is a perspective view of a discharge auger of a storage container according to aspects of the disclosure.

FIG. 14 is a perspective view of a perforated drying floor of a storage container according to aspects of the disclosure.

FIG. 15 is a perspective view of a discharge basket used in conjunction with a discharge auger of a storage container according to aspects of the disclosure.

FIG. 16 is a perspective view of a sweep auger according to aspects of the disclosure.

Various embodiments of the invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

FIG. 1 shows a depiction of a system 10 for exhausting contaminated air from a storage container in the form of a grain bin 12. While the grain bin 12 will be discussed for purposes of the disclosure, it should be appreciated that generally any type of particulate material storage could be used with a fan assembly, as will be described, in order to aid in removing harmful and/or hazardous inhalants or other airborne matter from within the storage container. For example, bins, silos, buildings, sheds, barns, trailers, carts, or generally any other type of temporary or permanent storage container should be contemplated for use with aspects of the disclosure.

As shown in the figures, the shape of the grain bin 12 is cylindrical in nature. However, it should be appreciated that other shapes, such as polyhedrons (including irregular and regular polyhedrons), ellipsoids (including spheres), partial ellipsoids (including hemispheres), cones, combinations of any of the preceding shapes, and generally any other shape could be used. The grain bins 12 are at least partially hollowed, but may be substantially hollowed in order to maximize the amount of particulate material to be stored and/or to maximize the amount of air that may flow through the storage containers.

Furthermore, while the term particulate material will be included, it is to be appreciated that such a term should have broad meaning, including, but not limited to, grain, seed, fertilizer, insecticide, dust, pollen, rock, gravel, dirt, stock, and/or some combination thereof.

For example, the grain bin 12 as shown in FIG. 1 includes a roof 14 atop a housing 16 formed by walls. The grain bin roof 14 includes vents 18, and the walls of the housing 16 are positioned on a foundation 20, such as a concrete foundation. The foundation 20 is positioned underneath a drying floor 22. The drying floor 22 may be supported by floor supports 24. The drying floor may be used in conjunction with a discharge basket 26 which feeds a discharge auger 28, and the discharge auger 28 may be used to remove particulate material from within the grain bin 12.

In another embodiment, the drying floor 22 is perforated and allows the flow of air from the bottom of the grain bin 12 in order to aid in drying the particulate material stored therein. Air can be directed ambiently, or via a forced mechanism, such as an existing bin fan 30, ventilation fan, and/or any other known mechanism capable of directing air, through the grain bin 12. The existing bin fans 30 may connect to a duct system 32 extending into the grain bin 12 near the bottom of the grain bin at a point where most, if not all, of the duct system 32 is positioned beneath the drying floor 22.

The grain bin 12 may be loaded with particulate material, such as particulate material collected after harvesting a crop from a field. FIG. 2 is a depiction of the grain bin 12 with particulate material stored within. In the embodiment shown, the particulate material is grain 34. The grain 34 may be loaded into the grain bin 12 in any number of ways known in the art.

However, to keep the grain 34 from rotting, it may be desired to dry and/or maintain air flow through the bin and/or material stored therein. Air can be directed via the existing bin fan 30 and duct 32, either on its own or forced via the existing bin fan 30. As shown by the arrows in FIG. 2, the air will be directed through the perforated drying floor 22 and through the stored grain 34 to aid in drying the grain 34. Some contaminated, excess, and/or used air can then be directed out of the grain bin 12 via the vents 18 in the roof 14.

When the amount of grain 34 within the grain bin 12 is to be used or otherwise removed from the grain bin 12, the discharge auger 28 can be activated. The discharge auger 28 is mechanically coupled to the discharge basket 26 at a central location of the grain bin 12 such that grain 34 is allowed to fall into the discharge auger 28 due to the force of gravity and move the grain 34 from the internal portions of the grain bin 12 to a location outside the grain bin 12. The performance of discharge auger 28 will be operated until the amount of grain 32 reaches a point (exemplified by FIG. 3) where an additional auger, such as a sweep auger 36 (shown in FIG. 4), may be needed to further empty the grain bin 12.

Figure 3:
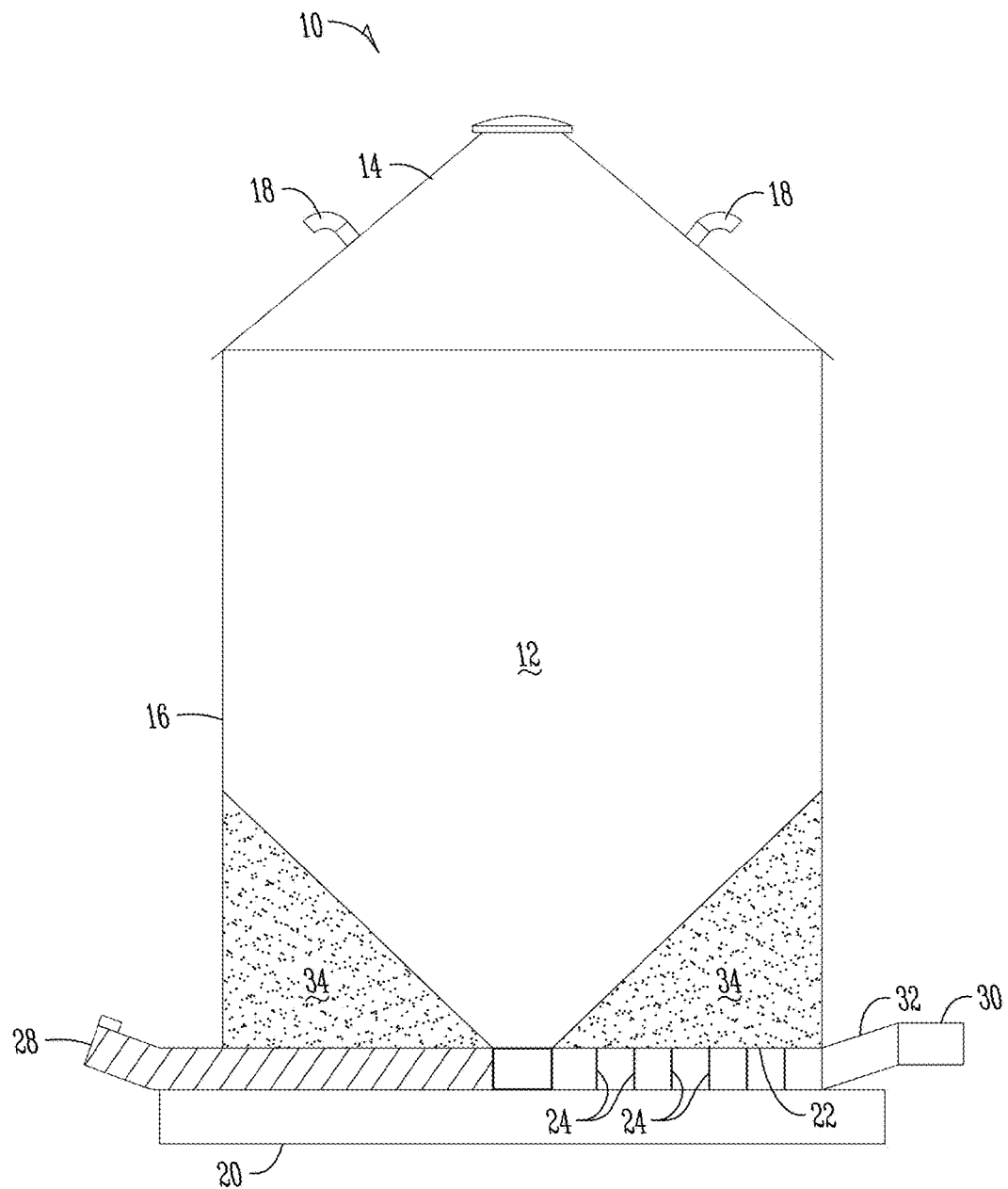
FIG. 3 is a depiction of the storage container of FIG. 2 during emptying and prior to use of a sweep auger.

FIG. 3 is provided primarily for illustrative purposes. One of ordinary skill in the art would recognize that the point in which the discharge auger 28 may need the help of an additional auger could vary. For example, it may depend on the weight, density, or water content of the particulate material, the shape of the storage container, the composition of the air within the storage container, or any other factor that would impede the collection of particulate material by the discharge auger 28.

Figure 4:
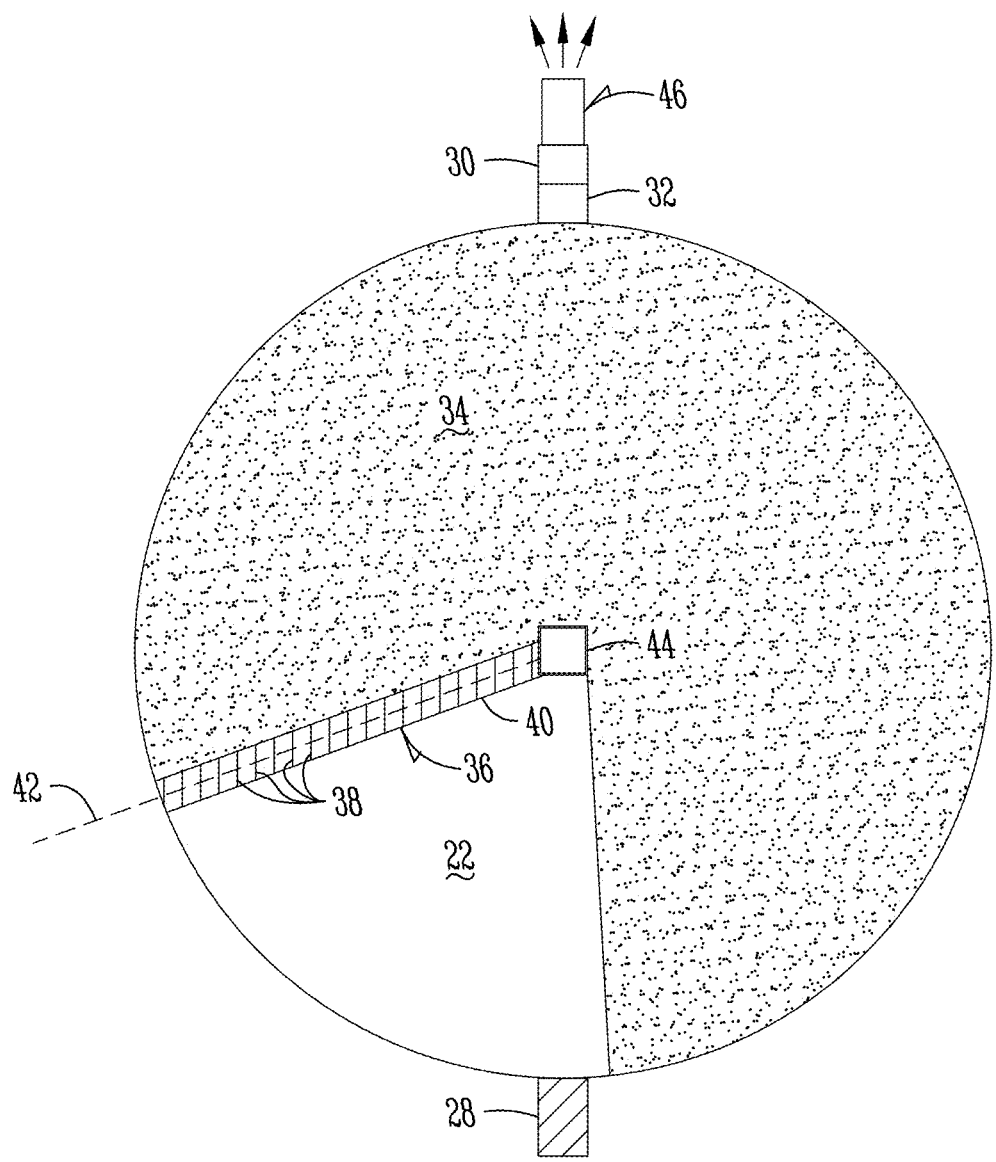
FIG. 4 is a depiction of the storage container with a sweep auger.
Figure 16:
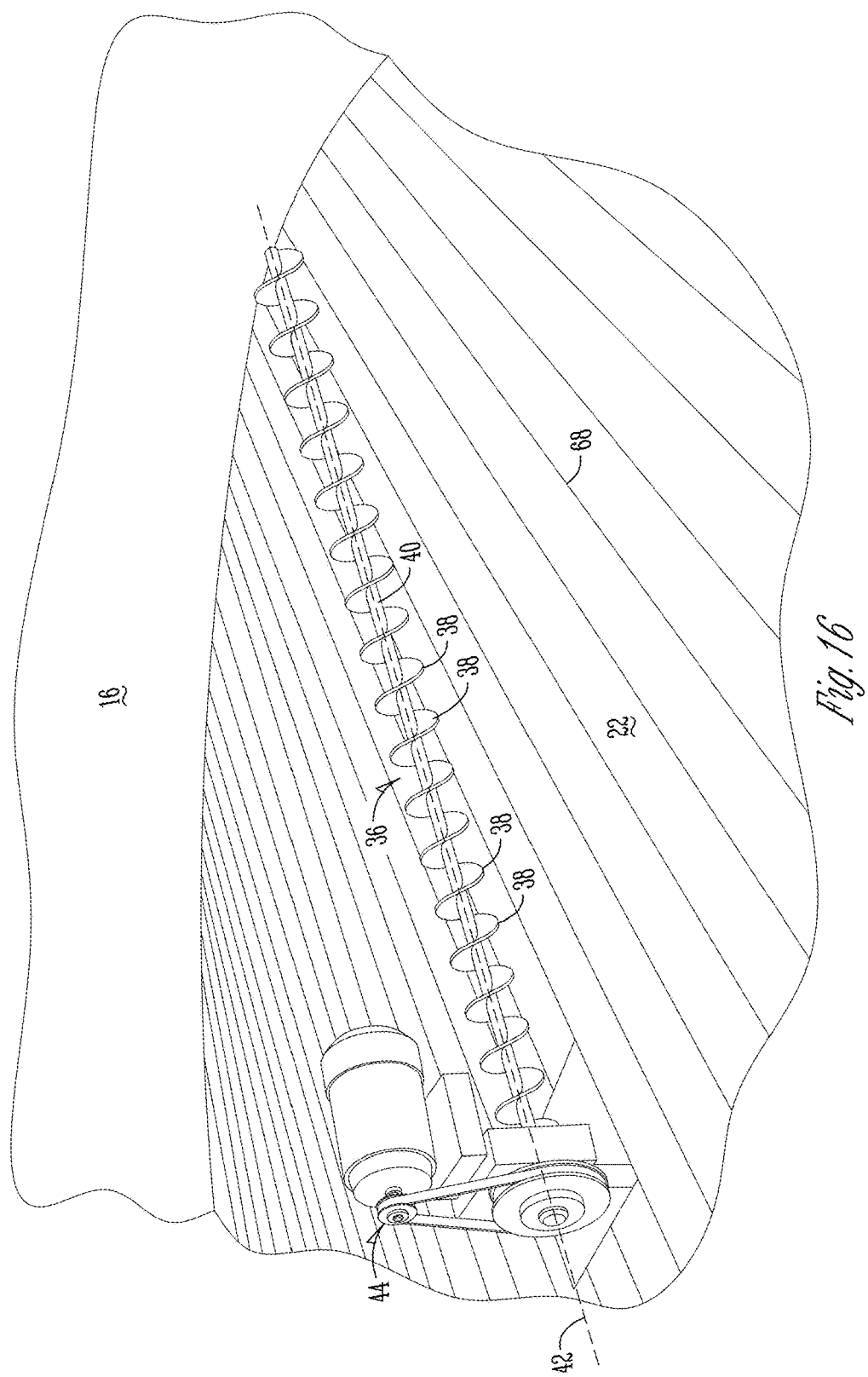

A sweep auger 36 is shown in FIGS. 4 and 16. The sweep auger 36 is centrally placed in the grain bin 12 and rotates about the interior of the grain bin 12. Flights 38 are welded or otherwise attached to a longitudinal auger 40 and are configured to rotate around a central axis 42 of the longitudinal auger 40 to aid in removing the grain 34 from the interior of the grain bin 12. The longitudinal auger 40 extends from a motor assembly 44, with the motor assembly 44 generally at the center of the grain bin 12. During operation, the motor of the motor assembly 44 causes the flights 38 to rotate around the central axis 42 of the longitudinal auger 40, while also causing the longitudinal auger 40 to rotate around the interior of the grain bin 12. Doing so allows the sweep auger 36 to move the grain 34 towards the discharge basket 26 of the discharge auger 28. Thus, the sweep auger 36 is a device that aids in removing particulate material from the grain bin 12.

Also shown in FIG. 4 is a fan assembly 46 that may be attached to the existing bin fan 30 of the grain bin 12. While the existing bin fan 30 provides air for drying material, there is nothing to actively remove air. For example, while the particulate material is being removed, either by the discharge auger 28 or by the sweep auger 36, the agitation of the material will cause matter to be introduced and to mix with the air (thus creating "airborne matter") within the grain bin 12. If a user enters the grain bin 12 to further aid in removing the particulate material, this airborne matter can become hazardous if inhaled, in part due to any parts of the particulate material mixing with the air. Therefore, an aspect of the disclosure includes the addition of a fan assembly 46, including an exhaust fan 48, to the existing bin fan 30, with the opposite effect of removing air from the bin. As shown in FIG. 4, the exhaust fan assembly 46 can be attached to the existing bin fan 30 for quick and easy connection to the grain bin 12 to provide quick and temporary relief while removing particulate material from the grain bin 12.

Figure 5:
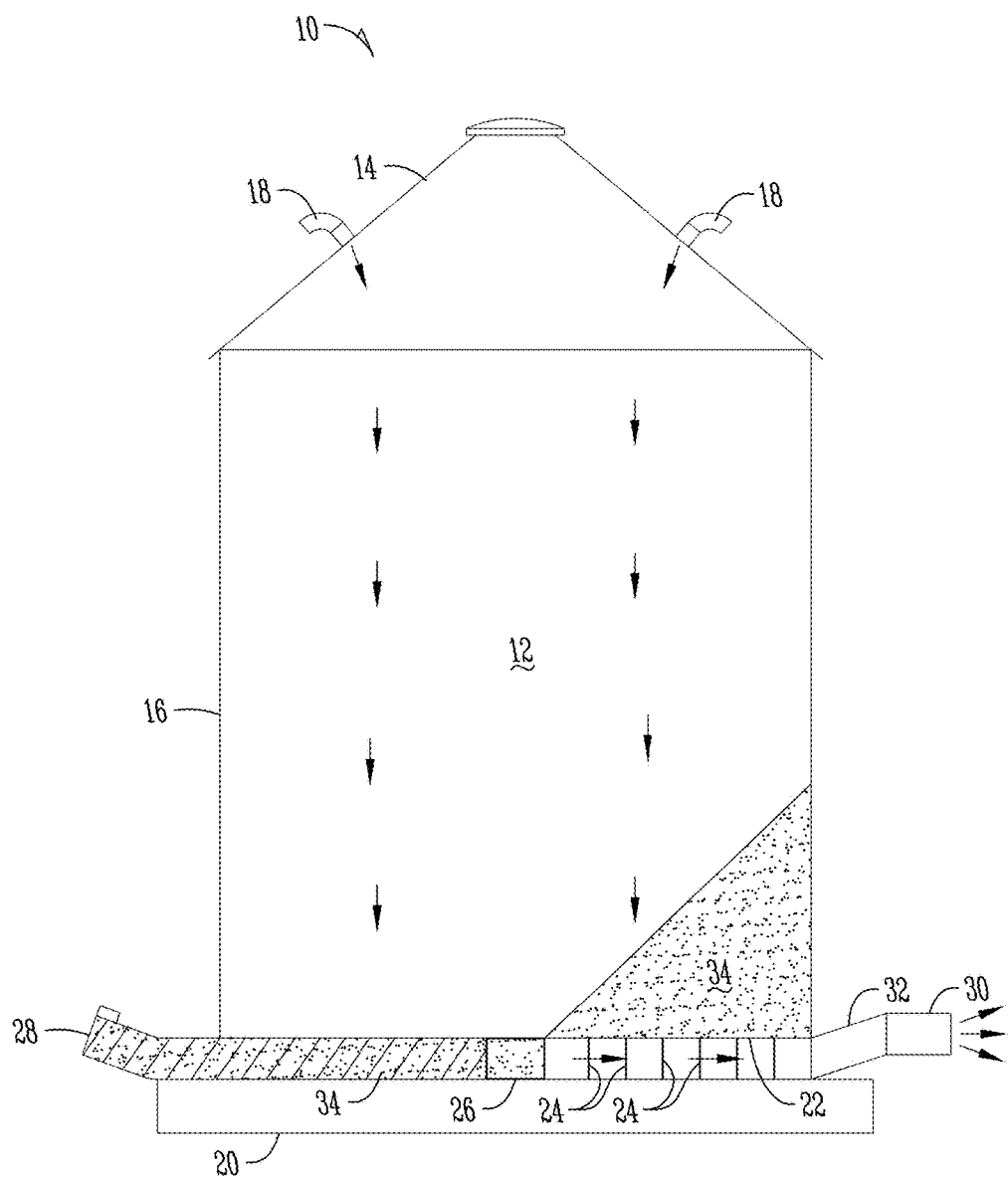
FIG. 5 is a depiction of the storage container with an exhaust fan assembly.

This process is shown generally in FIG. 5. As shown in FIG. 5, the sweep auger 36 is moving within the grain bin 12 to aid in removing the grain 34 therefrom. This is accomplished, in part, by moving the grain 34 towards the discharge auger 28. However, to aid in removing any dust that has been stirred from the grain or trapped in the grain, the fan assembly 46 of the present disclosure is activated.

The exhaust fan 48, which is connected to the ventilation system (existing bin fan 30 and duct 32), reverses the direction of air flow through the grain bin 12 and creates the air flow shown by the arrows in FIG. 5 to pull in fresh air via the roof vents 18. This fresh air moves through the grain bin 12, mixes with the contaminated dust/air mixture within the bin, and is directed through the drying floor 22 to a location outside of the grain bin 12 via the existing bin fan 30 and duct(s) 32 and by the exhaust fan 48 associated therewith. The removal of the contaminated air creates a safer environment within the grain bin 12 for anyone who may enter inside.

FIGS. 6-12 show aspects of the fan assembly 46 according to the present disclosure. Generally, the fan assembly 46 includes an exhaust fan 48, a mounting assembly 50, and a sealing member 52.

Figure 6:
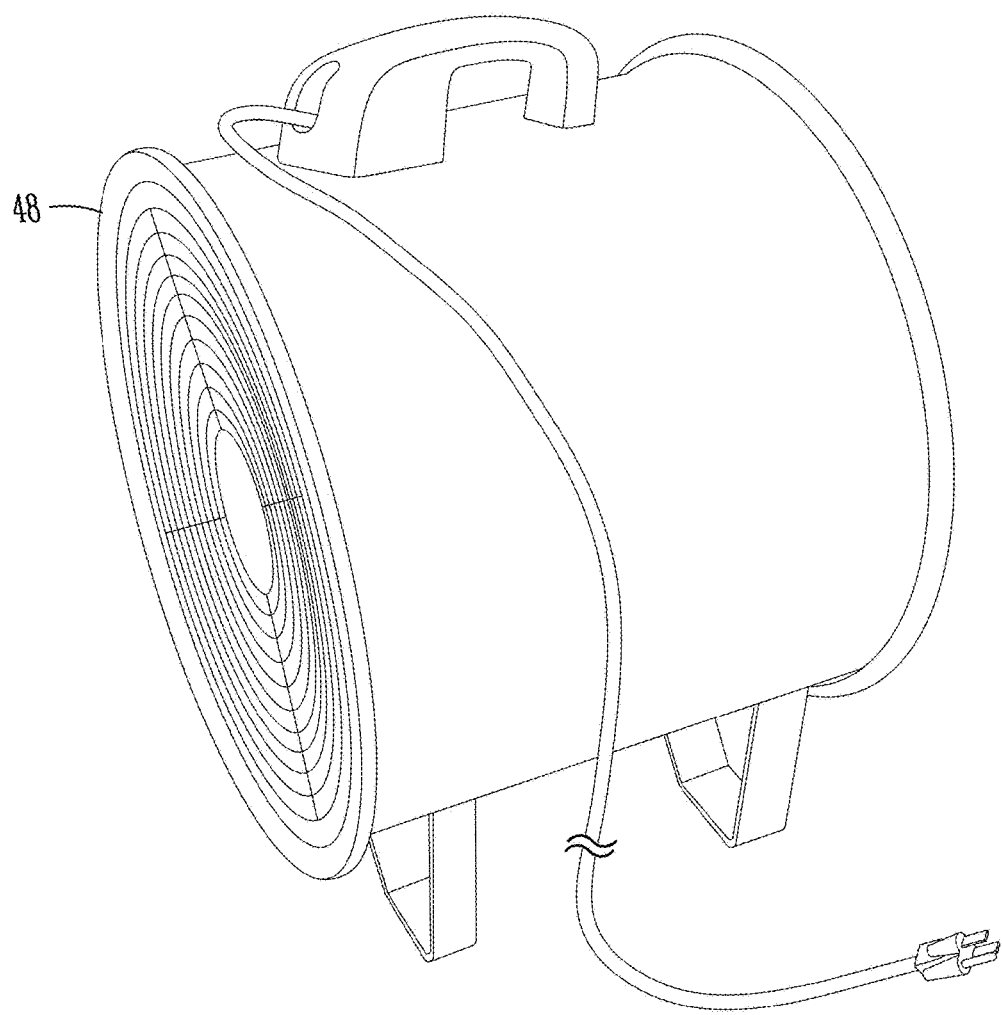

The exhaust fan 48, shown in FIG. 6, is generally any fan capable of moving air through and from a storage container, such as the grain bin 12. According to some aspects of the disclosure, the exhaust fan 48 may be portable, weigh less than 50 pounds, and/or weigh approximately 30 pounds. Additionally, the exhaust fan 48 may be operable at 110 volts, making it compatible with generally any plug in a location of use within the United States. In an alternative embodiment, the exhaust fan 48 may be operable at 220 volts, making it compatible with generally any plug within Europe. Simply put, at the very least, the present disclosure contemplates the exhaust fan 48 being operable at a voltage which makes it compatible with any standard plug in any country or location around the world.

Figure 7A:
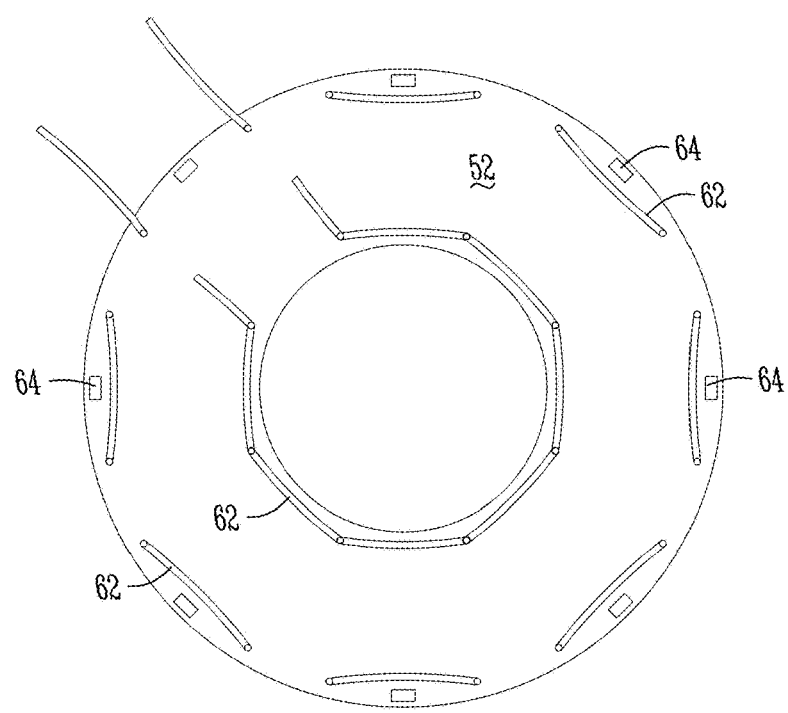
Figure 7B:
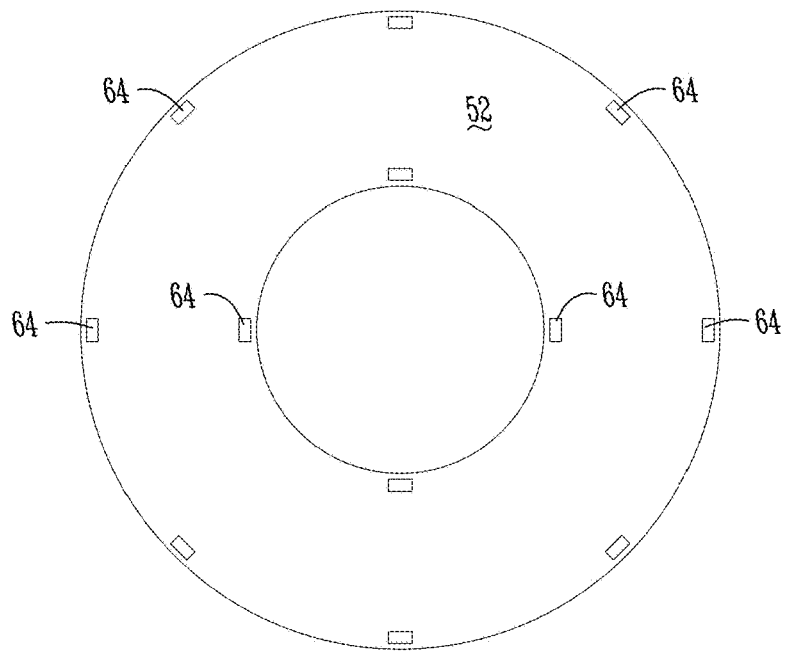
Figure 9:
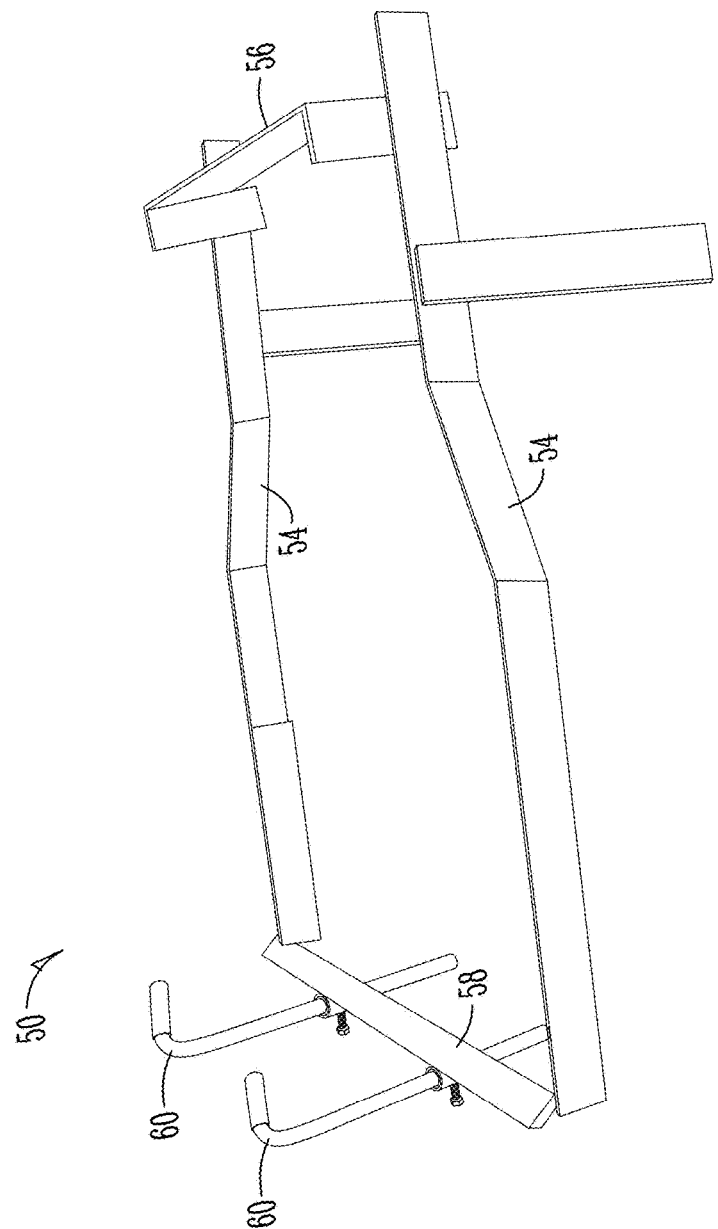

Also included as part of the fan assembly 46 is a sealing member 52. Exemplary sealing members are shown in FIGS. 7A and 7B to be a tarp, but it is to be appreciated that generally any substantially, fluidly impermeable material be used for the sealing member 52. The sealing member 52 is connected between the existing bin fan 30 and the exhaust fan 48 to provide a substantially air tight seal for allowing the exhaust fan 48 to pull the air from within the grain bin 12, especially due to possible variances in size between the existing ventilation fan 30 and the exhaust fan 48. The sealing member 52 may include tightening members, such as a string or strings 62, bungee cords, magnets 64, elastic, VELCRO, zipper, or otherwise, or any combination thereof, to tighten the sealing member 52 about either or both of the exhaust fan 48 and the existing bin fan 30.

For example, as shown in FIG. 7A, the sealing member includes grommets 66 with a draw string rope 62 positioned therethrough, wherein the pulling of the rope 62 will tighten up the seal in communication with the existing bin fan 30 and the exhaust fan 48. As shown in FIGS. 7A and 7B, the sealing member may include magnets 64. FIG. 7A shows 8 magnets symmetrically arranged around the center of the sealing member 52 and positioned radially or otherwise about the sealing member 52 to seal the sealing member 52 to one or both of the fans. FIG. 7B shows the sealing member 52 solely utilizing 12 magnets symmetrically arranged and positioned radially or otherwise about the sealing member 52 to seal the sealing member 52 to both of the fans.

It is to be appreciated that one end of the sealing member 52 may be sealed with one means, e.g., magnets, while the other utilize the same or a different means, e.g., bungee cords. The "sealing" of the sealing member 52 is to provide a substantially air tight seal at the fans to aid in directing the forced air and/or vacuum of the fan to the grain bin 12 or other storage container.

In the preferred embodiment, the inner edge of the sealing member 52 is secured to the exhaust fan 48 and the outer edge of the sealing member 52 is secured to the existing bin fan 30. Additionally, the sealing member 52 may be shaped like a donut, wherein the inner ring of the donut may have a diameter of 18 inches and the outer ring of the donut may have a diameter of 40 inches to correspond with the diameters of the exhaust fan 48 and existing bin fan 30, respectively.

Figure 10:
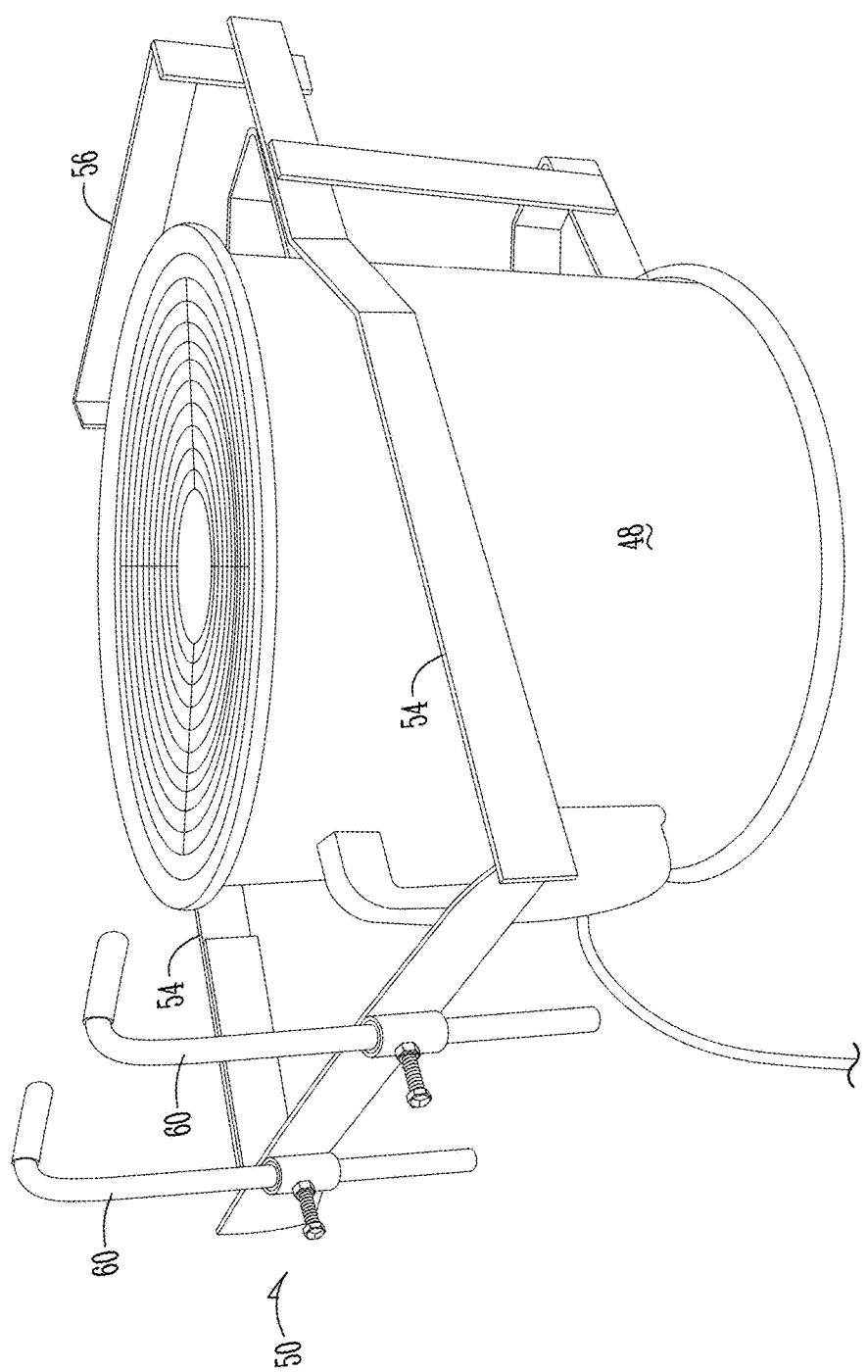

The fan assembly 46 can be adapted to most all types and sizes of existing bin fans 30 or other storage fans through the use of the mounting assembly 50 and/or sealing member 52. The mounting assembly 50, as shown best in FIGS. 8-9, includes adjustable side brackets 54, a bottom support bracket 56, a top adjustable hook bracket 58, and adjustable hooks 60. The components of the mounting assembly 50 may comprise formed steel and may be adjustable in order to be used with exhaust fans 48 of varying sizes, as shown in FIG. 10.

In another embodiment, the side brackets 54 are slidably received within the bottom support bracket 56 and the top adjustable hook bracket 58 and may be secured into a set position with a bolt. Alternatively, the bottom support bracket 56 and the top adjustable hook bracket 58 may be slidably received within the side brackets 54. Ultimately however, one of ordinary skill in the art would appreciate that these configurations are not intended to be limiting and may be substituted for other alternative configurations including other known fastening means capable of attaching the brackets to one another and to exhaust fans of varying sizes.

Figure 11:
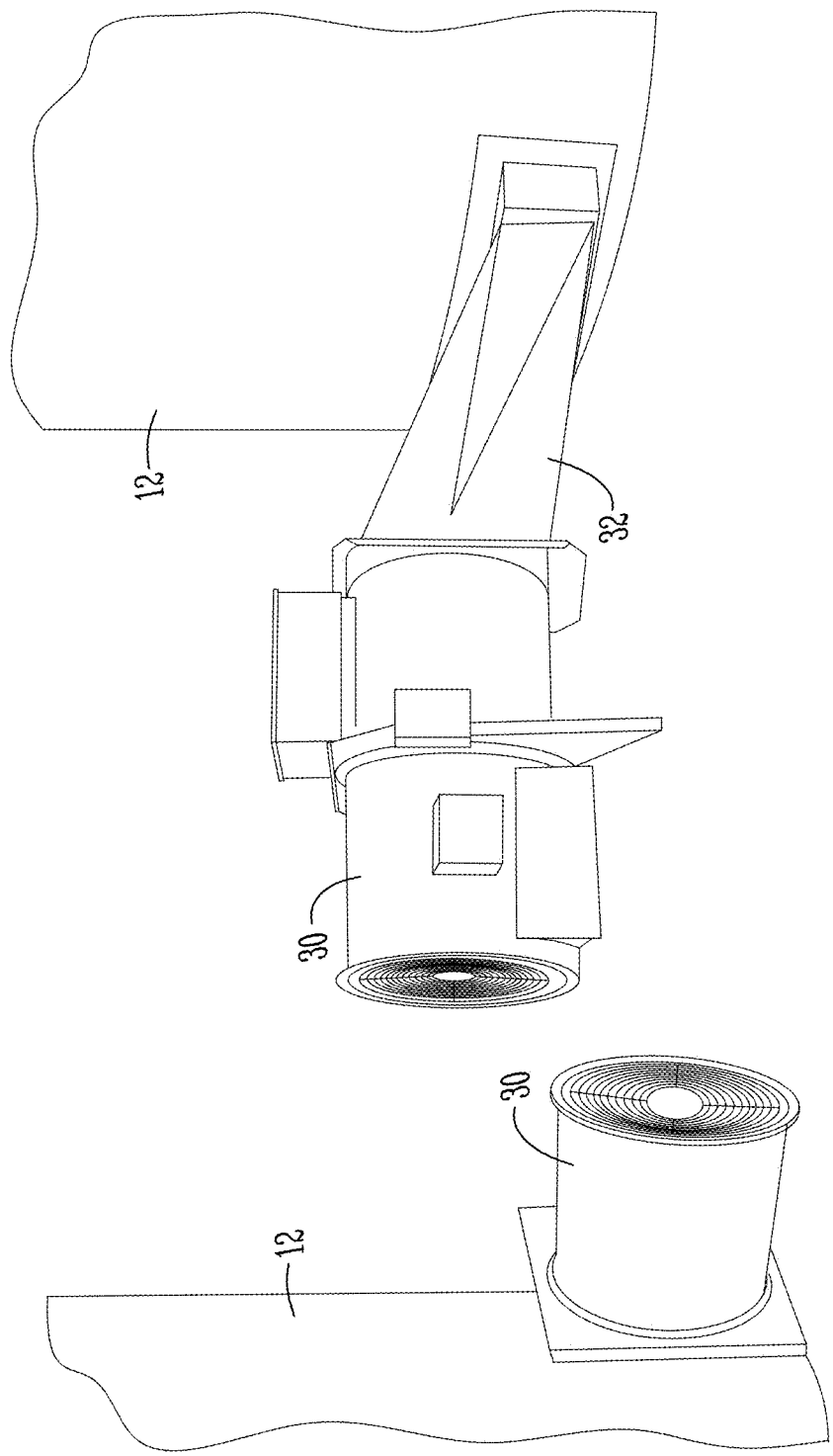

According to aspects of the disclosure, the existing bin fans 30 are shown in FIG. 11. The existing bin fans 30 are connected to a duct system 32 extending into the grain bin 12 near the bottom of the grain bin 12, such that most, if not all, of the duct system 32 is positioned below the drying floor 22.

According to some uses of the fan assembly 46, it is desired to substantially centralize the exhaust fan 48 with respect to the existing bin fan. Thus, the side brackets 54 may include a plurality of notches, holes, and other portions that allow for various diameters of fans. For example, the bottom support bracket 56 and top adjustable hook bracket 58 may attach to the side brackets 54. The distance between the top and the bottom of the mounting assembly 50 can be varied, in part, by the various locations of the notches or holes within the side brackets. The adjustable hooks 60 then attach to the top hook bracket 58 to hang the mounting assembly 50 and connected exhaust fan 48 to the existing bin fan 30 of the grain bin 12. This is shown in FIG. 12, wherein the exhaust fan 48 is generally centered relative to the existing bin fan 30, but this could be varied if the size of the existing bin fan 30 were different.

One way of assembling the fan assembly 46 is as follows. The existing bin fan 30, such as a ventilation fan, is measured. The exhaust fan 48, with known measurements, is generally centered within the outer circumference of the existing bin fan 30. The mounting assembly 50 is assembled and adjusted so that the hooks 60 can attach to the existing bin fan 30 to hang the exhaust fan 48 at substantially the center of the existing bin fan 30. The sealing member 52, such as a tarp, can be used to cover the existing bin fan 30. A draw string 62 may be tightened. Furthermore, additional sealing members, such as magnets 64, can be positioned on and about the bin fan to increase the seal to create a substantially airtight seal. The exhaust fan 48 can be plugged into a power source, and operated accordingly.

Figure 12:
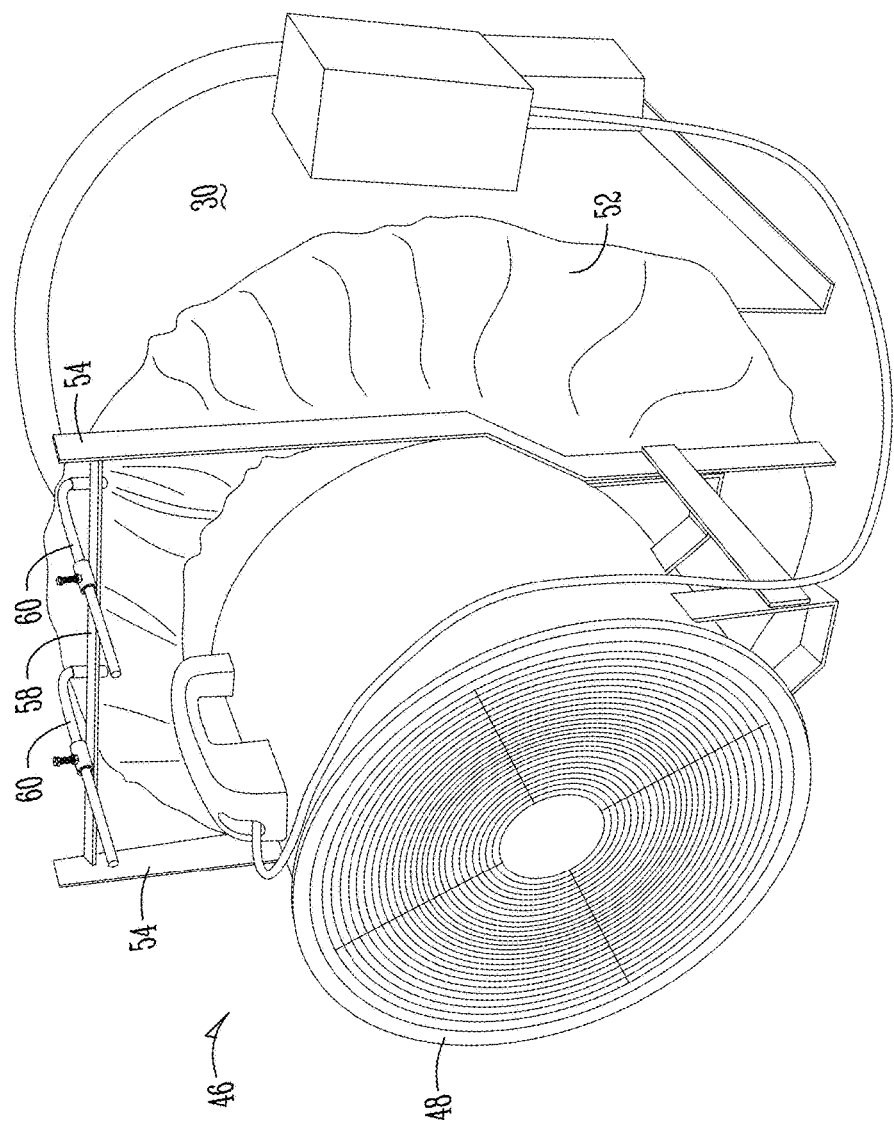

FIG. 12 shows the assembled fan assembly 46 connected to the existing bin fan 30 of a grain bin 12. The sealing member 52 (e.g., tarp) may be positioned within the mounting assembly 50 such that the sealing member is connected between the existing bin fan 30 and the exhaust fan 48 prior to the connection of the exhaust fan 48 to the existing bin fan 30 with the mounting assembly 50. However, either method is to be contemplated as part of the present disclosure. FIG. 11 shows the exhaust fan 48 connected to the mounting assembly 50, and FIG. 12 shows the adjustable sealing member 52.

Components of the grain bin are shown in more detail in FIGS. 13-16.

Figure 13:
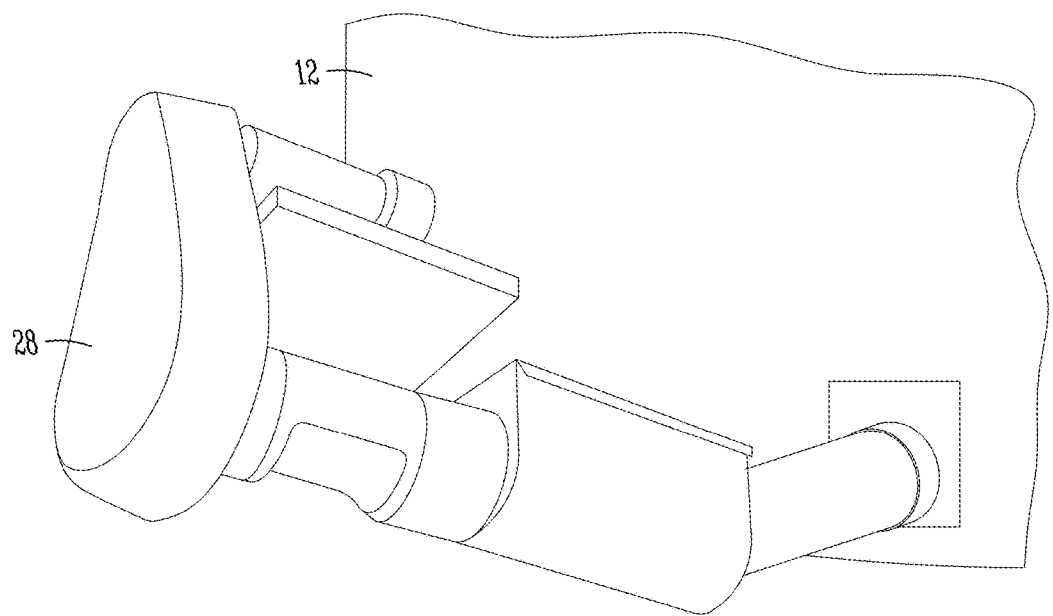

A discharge auger 28 is shown generally in FIG. 13. The discharge auger 28 is used to remove grain 34 or other particulate material from within the grain bin 12 to a location outside of the grain bin 12.

Figure 14:
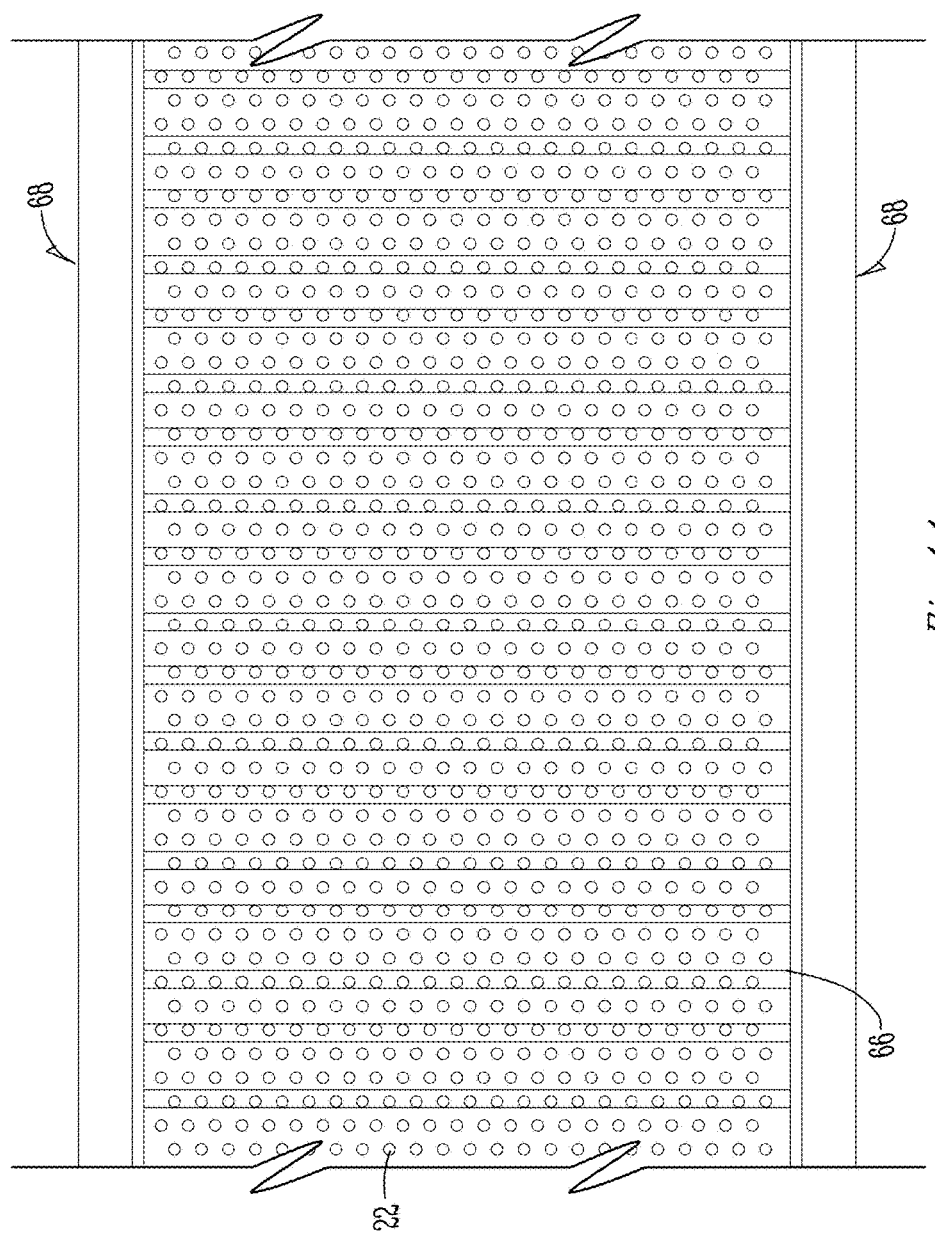
Figure 15:
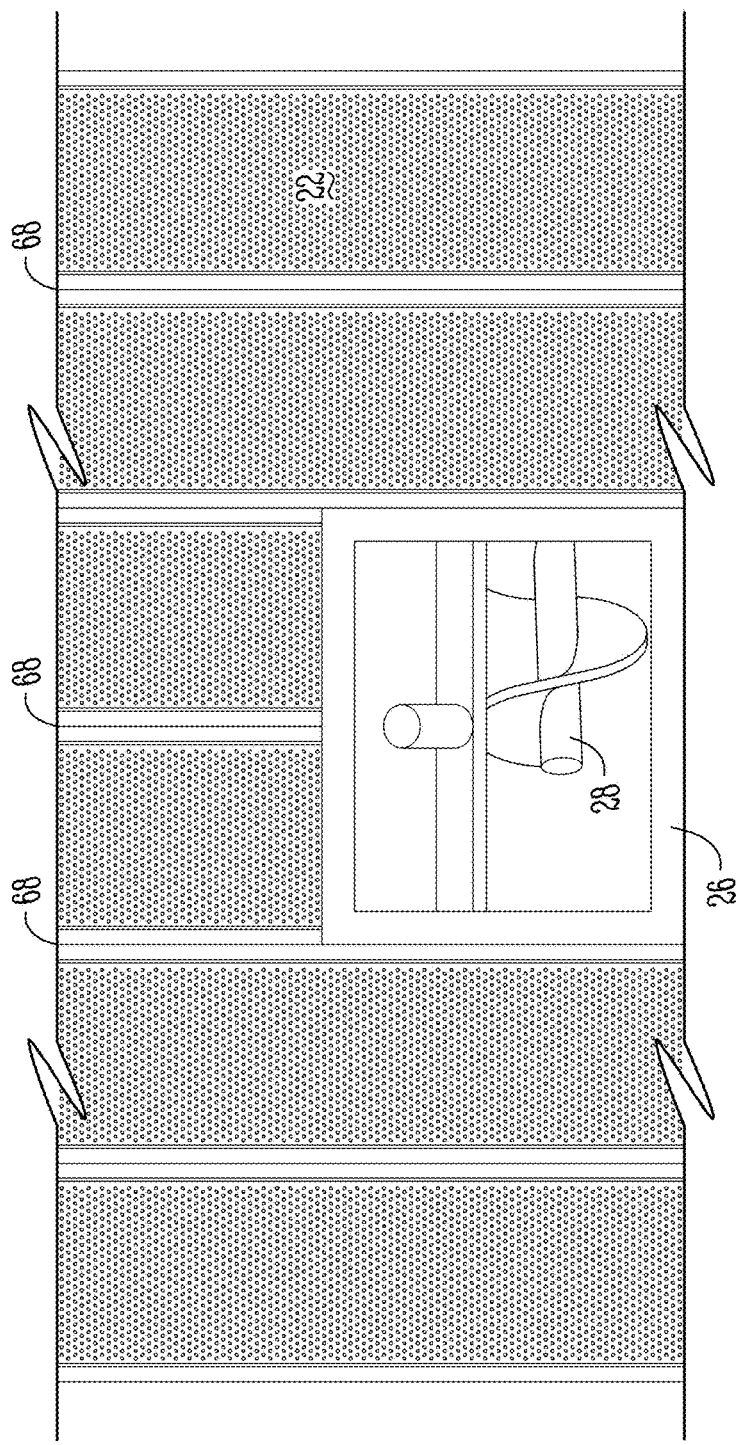

The perforated drying floor 22 of grain bin 12 is shown generally in FIG. 14, and in conjunction with a discharge basket 26 in FIG. 15, wherein the discharge basket 26 is centrally located within the grain bin 12 and feeds a discharge auger 28. In one embodiment, the drying floor 22 may have folds or ridges 66 and may be comprised of smaller sections made of a metallic material or any other material strong enough to bear the weight of the grain bin 12 being filled with particulate material. The smaller sections may then be welded together or otherwise attached at seems 68 to form the drying floor 22.

A sweep auger 36 is shown generally in FIG. 16. The sweep auger 36 is used to push grain 34 or other particulate material from within the grain bin 12 into the discharge basket 26 such that the grain 34 can be removed by the discharge auger 28 to a location outside of the grain bin 12.

The fan assembly 46 as shown and described provides numerous advantages. For example, the fan assembly 46 is very portable and lightweight. The fan assembly 46 can be adjusted to be used with generally any type, size, etc. of existing bin fans 30, such as a ventilation fan. The fan may operate on 110 volts, which reduces the need for a specialized power source as well. The operation of the exhaust fan 48 creates a significantly safer environment in an area in which particulate material has been stirred to release dust and other debris in to the air by removing any contaminated air (e.g. air that has become an inhalation or combustible hazard). This also allows for better cleaning of storage containers, such that the container will have a reduced chance of mold, mildew, or otherwise rotten material therein.

Therefore, a fan assembly for exhausting matter from a storage container has been shown and described. It should be appreciated that, while many aspects, embodiments, and the like have been shown and described, these are not to be limiting to the disclosure. Furthermore, any changes, modifications, improvements, and the like that are obvious to those skilled in the art are to be considered part of the present disclosure.

What is claimed is:

1. A fan assembly for attaching to and using with an existing fan of a storage container, the fan assembly comprising:
   an exhaust fan;
   a mounting assembly for operatively mounting the exhaust fan to the existing fan of the storage container; and a sealing member operatively positioned between the exhaust fan and the existing fan to provide a seal to direct movement of air streams created, in part, by the exhaust fan.

2. The fan assembly of claim 1, wherein the sealing member comprises a tarp.

3. The fan assembly of claim 2, further comprising a plurality of magnets in operative communication with the tarp and at least partially surrounding the existing fan to aid in sealing the exhaust fan.

4. The fan assembly of claim 2, further comprising a string in operative communication with the tarp and at least partially surrounding the existing fan to aid in sealing the exhaust fan.

5. The fan assembly of claim 4, further comprising a plurality of magnets in operative communication with the tarp and at least partially surrounding the existing fan to aid in sealing the exhaust fan.

6. The fan assembly of claim 1, wherein the mounting assembly is used to substantially center the exhaust fan relative to the existing fan.

7. The fan assembly of claim 1, wherein the mounting assembly comprises:
 a. adjustable side brackets;
 b. a bottom support bracket; and
 c. a top hook bracket;
  wherein the brackets are used to substantially center the exhaust fan relative to the existing fan.

8. The fan assembly of claim 7, further comprising first and second hooks operatively attached to the top hook bracket for hanging the exhaust fan to the existing fan.

9. A storage system comprising:
 a storage container having walls and a roof including vents;
 the fan assembly of claim 1, wherein:
  the existing fan is attached to an existing fan duct; and
  the existing fan duct is attached to the storage container near the bottom of the storage container.

10. The storage system of claim 9, wherein the storage container is filled with a particulate material.

11. The storage system of claim 10, wherein the storage container has a perforated drying floor.

12. The storage system of claim 11, wherein the existing fan is configured such that, during operation of the existing fan, the existing fan pushes air through the existing fan duct and into the storage container through the perforated drying floor such that (a) the air rises in the storage container, (b) the air dries the particulate material as it rises, and (c) some of the air can escape the storage container via the vents.

13. The storage system of claim 12, further comprising:
 a discharge basket centrally located in the perforated drying floor of the storage container capable of collecting the particulate material by allowing the particulate material to fall into the discharge basket; and
 a discharge auger configured to transport the particulate material from the discharge basket to a location outside the storage container when the discharge auger is activated.

14. The storage system of claim 13, wherein prolonged or repeated operation of the discharge auger causes the amount of particulate material within the storage container to decrease to a point where additional assistance is needed to further empty the storage container.

15. The storage system of claim 14, further comprising a sweep auger capable of pushing particulate material remaining in the storage container after the amount of particulate material in the storage container reaches the point where additional assistance is needed to further empty the storage container into the discharge basket comprising:
 a longitudinal auger having a central axis;
 flights attached to the longitudinal auger; and
 a motor configured to cause the flights to rotate around the central axis of the longitudinal auger and the longitudinal auger to rotate around the interior of the storage container during operation.

16. The storage system of claim 15, wherein the repeated emptying, filling, and use of the existing fan causes the air within the storage container to become contaminated with airborne matter.

17. The storage system of claim 16, wherein the exhaust fan is configured such that, during operation of the exhaust fan, the exhaust fan pulls the contaminated air through the perforated drying floor into the existing fan duct and existing fan and exhausts the contaminated air and airborne matter from the storage container.

18. The storage system of claim 10, wherein:
 the storage container is a grain bin;
 the existing fan is an existing bin fan;
 the existing duct is an existing bin fan duct; and
 the particulate material is grain.

\* \* \* \* \*